Feb. 21, 1956 L. SCHWOB 2,735,301
HIGH ACCURACY ELECTRIC LEVEL INDICATOR
Filed Dec. 31, 1952
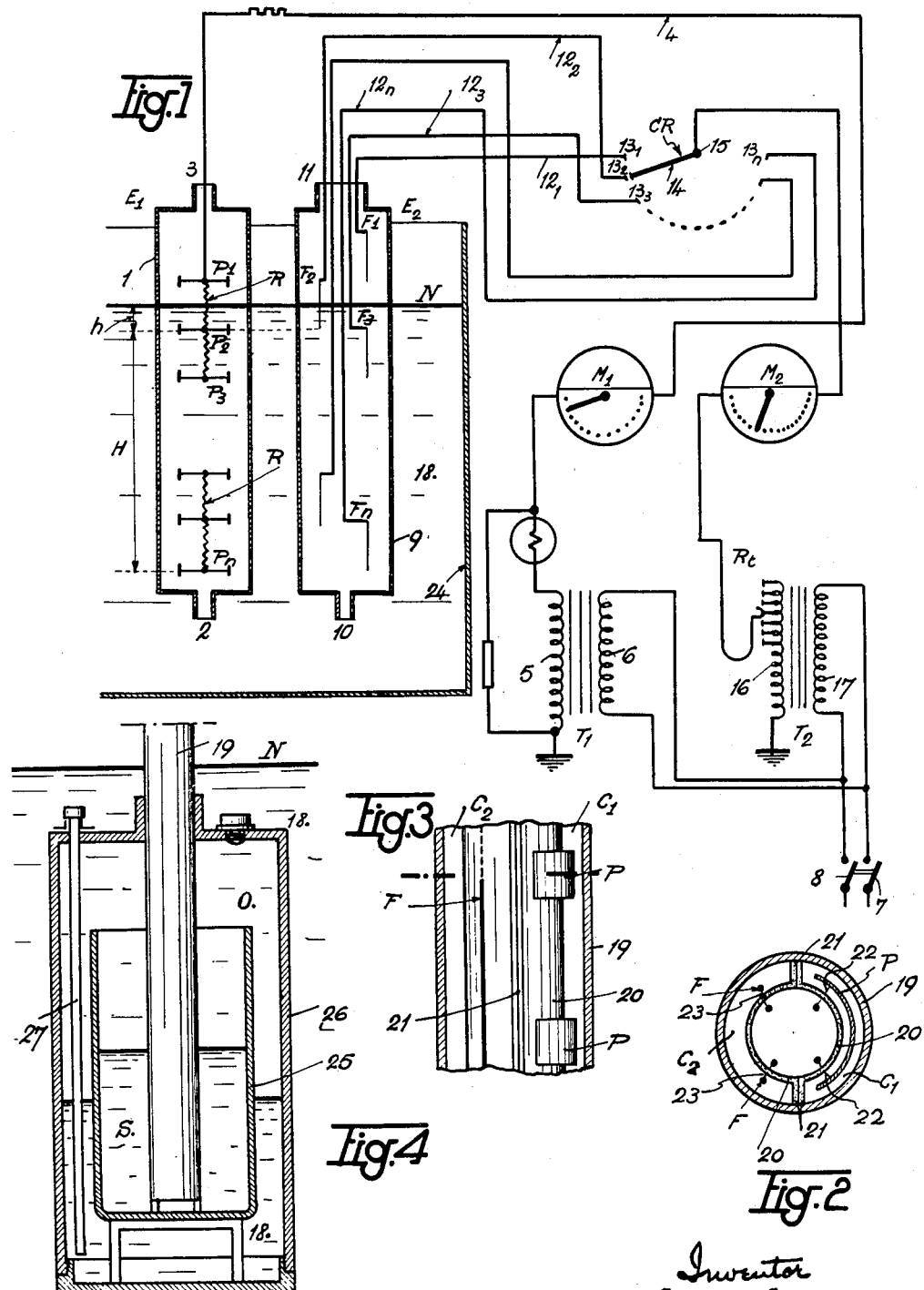

United States Patent Office 2,735,301
Patented Feb. 21, 1956

2,735,301

HIGH ACCURACY ELECTRIC LEVEL INDICATOR

Louis Schwob, Paris, France, assignor of one-half to Societe Anonyme Dite: "Appareillage V. F. B.," Argenteuil, France, a French company Application December 31, 1952, Serial No. 328,856

Claims priority, application France January 18, 1952

4 Claims. (Cl. 73—304)

Level indicators are already known that resort to the conductivity of water or the like liquids of which it is desired to ascertain the level. Such indicators include a limnimetric scale constituted by a number of contact-pieces connected by resistances inserted in series in an A. C. circuit fed with a very low stabilized voltage and associated with a milliammeter, said resistances being generally enclosed inside a metal sheath that is open at both ends. The system constituted by the sheath, its contact-pieces and the associated resistances is immersed inside the container the level in which is to be ascertained. The liquid engaging the contact-pieces inside the sheath short-circuits the corresponding resistances and produces, as its level is shifted, modifications in the intensity of the current, said modifications being a function of said level. These modifications are measured at the control station by the milliammeter that is gauged in height or volume units.

The accuracy of such a type of indicator depends on the spacing of the contact-pieces. It is limited, furthermore, by the accuracy of the actual measuring instrument which is of the order of 1 to 2%, according to the type of apparatus considered.

My invention has for its object an indicator developed in accordance with the same principle, but allowing a much higher accuracy.

My improved indicator includes two limnimetric scales of which one, executed in accordance with prior art, is adapted to provide a rough indication of the liquid level as a function of the number of contact-pieces that are not immersed in the liquid and includes a number of metal contact-pieces that are enclosed inside a metal sheath, preferably at uniformly distributed heights, and are interconnected by resistances inserted in series in a circuit fed with low A. C. voltage and passing through a milliammeter, while the other scale, which is adapted to produce an accurate indication of the level with reference to the highest liquid-bathed contact-pieces of the first scale, includes a series of identical independent, preferably wire-shaped metal parts, housed inside a metal sheath and insulated with reference thereto; each of said metal parts assumes an operative height equal to the vertical spacing between two successive contact-pieces in the first scale and distributed throughout the height of the liquid, the level of which is to be ascertained, at the rate of one of such metal parts for each interval between two successive contact-pieces of the first scale; each of said metal parts is connected through a separate insulated lead and through the agency of a switch including as many terminals as there are metal parts, with a second milliammeter also inserted in a low voltage A. C. circuit and the circuits passing through the two milliammeters respectively are grounded through the liquid and the metal sheaths of the corresponding limnimetric scale that are connected with ground. The desired level of the liquid is given out by the sum of the indications given out by the two milliammeters that are suitably gauged in values of height.

Further features and advantages of my invention will appear in the reading of the following description.

In accompanying drawings, I have illustrated diagrammatically by way of example:

In Fig. 1, an electric wiring diagram of the level-indicator according to my invention;

In Figs. 2 and 3, a cross-section and a vertical elevational view, partly sectional, of a portion of the outer sheath, in an embodiment of said level indicator given by way of example and by no means in a binding sense;

In Fig. 4, a cross-section of a particular embodiment of said indicator.

Turning to Fig. 1, 1 designates a metal sheath open at both ends at 2 and 3, to allow the liquid to enter freely into said sheath which encloses a first conventional limnimetric scale E–1 in which a number of metal contact-pieces P–1, P–2, P–3 . . . P–$n$ are distributed uniformly inside the sheath; they are interconnected by electric resistances R which are inserted in series through a lead 4 with a milliammeter M–1 fed by the secondary 5 of a voltage-lowering transformer T–1 of which the primary 6 is connected with a source of electric energy, such as the mains 7, through a current-breaker 8. 9 designates a further metal sheath also open at its ends 10 and 11 and forming part of a second limnimetric scale E–2 wherein are provided $n$ vertical resistance wires F–1, F–2, F–3 . . . F–$n$, which are all identical with and independent of one another; the operative height of each of said wires or the like parts is equal to the vertical spacing between two successive contact-pieces P on the first scale E–1 and they are each positioned in register with the space separating two such corresponding successive contact-pieces P. Thus, the uppermost part F–1 is located just above the contact-piece P–1, the part F–2 is located exactly in register with the interval between the contact-pieces P–1 and P–2 . . . and so on. Each part F is connected by means of a separate lead 12–1, 12–2, 12–3 . . . 12–$n$ with the corresponding connecting terminals 13–1, 13–2, 13–3 . . . 13–$n$ of a multiple switch C$r$ comprising a selecting slider arm 14 associated with a stationary terminal 15 connected with a milliammeter M–2 fed by the secondary 16 of a transformer T–2 provided with a number of tappings, and associated with a voltage regulator R$t$ while its primary 17 is also fed by the mains or the like source 7 of electric energy.

The low voltage A. C. circuit feeding the milliammeter M–1 is grounded through the metal sheath 1, the liquid in which the latter is immersed, the resistances R that are not short-circuited and the wire 4.

The low voltage A. C. circuit feeding the milliammeter M–2 is similarly grounded through the metal sheath 9, the liquid in which the latter is immersed, the part F located immediately above the uppermost contact-piece P bathed by the liquid and the switch C$r$.

The operation of my improved indicator is as follows: the sheaths 1 and 9 of the limnimetric scales are immersed inside the liquid 18 the level of which it is desired to control, said level being assumed to lie at N.

The switch 8 is then closed so as to energize the parallel circuits of the two milliammeters M–1 and M–2.

The intensity of current indicated by the first milliammeter M–1 depends on the number of resistances R that are not short-circuited by the liquid.

In the case of Fig. 1, only the resistance separating the contact-pieces P–1 and P–2 between which the level N of the liquid is to be found, is not short-circuited. There may thus be read on the milliammeter M–1 a rough measurement, the accuracy of which is say of the order of 1 decimeter, according to the gauging of said milliammeter, of the level N of the liquid, which level is defined, as a matter of fact, by the uppermost contact-piece on the scale E–1 that is liquid-bathed.

The slider arm 14 of the switch Cr is then set on the connecting terminal 13-2 which provides connection with the wire 12-2 leading to the element F-2 of the scale E-2 corresponding to the interval between the successive contact-pieces P-1 and P-2 of the scale E-1 lying to either side of the level N. The current intensity given out by the second milliammeter 2 will depend on the depth of immersion of said part F-2 and on the resistivity of the liquid sheath enclosing the immersed section of said part F-2. As a matter of fact, the actual resistivity of the liquid will play a part in the measuring of the current intensity while, in the case of the milliammeter M-1 and of the scale F-1, the resistance of the liquid is negligible with reference to the value of the resistances 3 inserted between the contact-pieces P.

It is thus possible to read on the milliammeter M-2 a highly accurate measure of the level, for instance on a millimetric scale in accordance with the gauge of said instrument, said measuring giving out the height $h$ comprised between the uppermost immersed contact-piece P-2 and the level N of the liquid.

Finally the first milliammeter M-1 having given an indication of height H and the second milliammeter M-2 having provided an indication of height $h$, the level N sought for will be the sum $H+h$ of said two indications.

In order to take into account the possible modifications of the resistance of the liquid 18, it is necessary to proceed as follows: before reading the milliammeter M-2, the slider arm of the switch Cr is caused to register with the connecting terminal 13-3 corresponding to the second uppermost contact-piece P-3 of the scale E-1. It is apparent that the corresponding part F of the scale E-2 is completely immersed, while the exact corresponding height separating two successive contact-pieces P is a known factor. Said part F-3 serves thus as a gauge: if the milliammeter M-2 gives out a correct indication of said height, it is possible to operate at once through the connecting terminal 13-2. If not, the hand of the milliammeter M-2 should be returned to the desired position through operation of the voltage-adjusting means $Rt$. It is then possible to shift the slider arm 14 into contact with the terminal 13-2 and to read the desired height $h$ on the milliammeter M-2.

This manner of adjusting is suitable for variations in resistivity which may reach a figure as high as 50%. I will disclose hereinafter how it is possible to proceed when the resistivity of the liquid is liable to vary to a more considerable extent at different times, for instance in the case of a river, carrying variable amounts of acid or alkaline matter.

Figs. 2 and 3 illustrate a particular embodiment of the electric level indicator in which the two scales E-1 and E-2 are carried inside a unitary metal sheath 19. This sheath 19 of tubular shape is subdivided into two compartments C-1, C-2 by an insulating carrier 20 that assumes also a tubular shape and includes two radial flanges 21 forming the separating partitions.

The contact-pieces P on the scale E-1 are carried inside the compartment C-1 and are formed by curved metal plates secured to the inner insulating carrier 20 for instance, while the parts F forming the scale E-2 are positioned in the other compartment C-2 and are constituted by metal wires arranged in staggered formation with reference to the insulating carrier 20 so as not to touch one another. The cross-sectional area of the wires F may be constant or variable according to the law of variation of the measurement with reference to the level height that it is desired to obtain.

Terminals 22 and 23 connected respectively with the contact-pieces P and with the parts F are provided for the connection, through the wall of the tubular carrier 20, respectively between the contact-pieces P and the resistances R and lead 4 and between the parts F and the leads 12.

It is possible without unduly widening the scope of the invention to design various other embodiments of my improved instrument and to modify as desired the arrangement and the grouping of the different members cooperating in the execution of the invention.

The connection between the scale and the measuring instruments may be performed by multi-lead cables of the telephonic type.

In the case of very long distances, it is of interest to leave the switch Cr close to the container 24 containing the liquid and to control said switch from the control station through any suitable remote control system, the measuring instruments M-1, M-2 being positioned together with the feed transformers at the control station.

If the resistivity of the liquid is liable to vary considerably from one moment to the other, for instance as mentioned in the case of a river carrying variable amounts of acid or alkaline material, it is possible to resort as illustrated in Fig. 4 to an arrangement disclosed in my prior French Patent 622,931 dated January 30, 1932. The limnimetric scales that may be for instance of the type illustrated in Figs. 2 and 3 are then introduced inside their sheath 19 in a position close to the bottom of an auxiliary container 25 that is open at its upper end and is partly filled with a certain amount of an auxiliary solution, having a predetermined constant resistivity S, which acts therefore on the limnimetric scales; and auxiliary container 25 rests on the bottom of a closed bottle or chamber 26 enclosing a predetermined amount of the liquid 18 the level of which is to be ascertained and that may permanently enter the chamber 26 from the outside through the pipe 27. The sheath 19 passes fluidtightly through the upper end of the chamber 26 so as to communicate with the atmosphere. The bottle or chamber 26 is then filled completely with oil above the level of said liquid 18, so as to leave no empty space in said chamber, said oil covering also the auxiliary liquid in the container 25.

If the system of scales is immersed with the bottle 26 inside the liquid mass the level of which is to be ascertained, equilibrium will be established immediately between the level of the latter and that of the auxiliary solution having a reference resistivity S through the agency of the body of oil O which acts as a piston and prevents any mingling between the two liquids. In this case, the composition of the solution S is constant and its resistivity depends only on the modifications in temperature which it is possible to keep within a comparatively narrow range, provided sufficient care is exercised.

What I claim is:

1. An electric level indicator comprising a metal sheath open at both ends and immersed in the liquid the level of which is to be ascertained, an insulated hollow member within the sheath constituting part of a partition subdividing the inside of said sheath into two compartments, a primary limnimetric scale including a plurality of metal contact-pieces within said sheath and lying at superposed levels, resistances connecting said contact-pieces in series, said contact-pieces and resistances being inserted inside the first compartment of the sheath, a first milliammeter an electric circuit in which the milliammeter is inserted in series with the series of resistances and a supply of low A. C. voltage inserted in said circuit and a secondary limnimetric scale including a plurality of similar independent metal parts within said sheath and extending each over an operative height equal to the spacing between two corresponding successive contact-pieces of the first scale, each of said parts lying in horizontal register with the interval separating the two corresponding successive contact-pieces of the first scale, said metal parts being inserted in the second compartment of the sheath and mounted therein insulatingly with reference to the sheath, partition and one another, said independent metal parts constituting resistances so arranged as to be progressively shorted out by the liquid to vary the effective resistance in the gauge circuit, a multiple way switch constituted by a common terminal, a plurality of connecting terminals and means selectively connecting said common terminal with the different connecting terminals, leads connecting each of said switch connecting terminals with the corresponding parts of the second scale, a second milliammeter, a circuit connecting said second milliammeter with the common terminal of the switch, a source of low A. C. voltage inserted in said circuit for feeding said second milliammeter and means for grounding the metal sheaths and adapted to close the corresponding circuits over the corresponding milliammeters and the immersed parts of the corresponding scales.

2. An electric level indicator comprising a metal sheath open at both ends and immersed in the liquid the level of which is to be ascertained, an insulated hollow member within the sheath constituting part of a partition subdividing the inside of said sheath into two compartments, a primary limnimetric scale including a plurality of metal contact-pieces within said sheath and lying at superposed levels, resistances connecting said contact-pieces in series, said contact-pieces and resistances being inserted inside the first compartment of the sheath, a first milliammeter, an electric circuit in which the milliammeter is inserted in series with the series of resistances and a supply of low A. C. voltage inserted in said circuit and a secondary limnimetric scale including a plurality of similar independent rectilinear wires within said sheath and extending each over an operative height equal to the spacing between two corresponding successive contact-pieces of the first scale, each of said rectilinear wires lying in horizontal register with the interval separating the two corresponding successive contact-pieces of the first scale, said metal rectilinear wires being inserted in the second compartment of the sheath and mounted therein insulatingly with reference to the sheath, partition and one another, said independent wires constituting resistances so arranged as to be progressively shorted out by the liquid to vary the effective resistance in the gauge circuit, a multiple way switch constituted by a common terminal, a plurality of connecting terminals and means selectively connecting said common terminal with the different connecting terminals, leads connecting each of said switch connecting terminals with the corresponding rectilinear wires of the second scale, a second milliammeter, a circuit connecting said second milliammeter with the common terminal of the switch, a source of low A. C. voltage inserted in said circuit for feeding said second milliammeter and means for grounding the metal sheaths and adapted to close the corresponding circuits over the corresponding milliammeters and the immersed parts of the corresponding scales.

3. An electric level indicator comprising a metal sheath open at both ends and immersed in the liquid the level of which is to be ascertained, an insulated hollow member within the sheath constituting part of a partition subdividing the inside of said sheath into two compartments, a primary limnimetric scale including a plurality of metal contact-pieces within said sheath and lying at superposed levels, resistances connecting said contact-pieces in series, said contact-pieces and resistances being inserted inside the first compartment of the sheath, a first milliammeter, an electric circuit in which the milliammeter is inserted in series with the series of resistances and a supply of low A. C. voltage inserted in said circuit and a secondary limnimetric scale including a plurality of similar independent rectilinear wires within said sheath and extending each over an operative height equal to the spacing between two corresponding successive contact-pieces of the first scale, each of said rectilinear wires lying in horizontal register with the interval separating the two corresponding successive contact-pieces of the first scale, said metal rectilinear wires being inserted in the second compartment of the sheath and mounted therein insulatingly with reference to the sheath, partition and one another, said independent wires constituting resistances so arranged as to be progressively shorted out by the liquid to vary the effective resistance in the gauge circuit, a multiple way switch constituted by a common terminal, a plurality of connecting terminals and means selectively connecting said common terminal with the different connecting terminals, leads connecting each of said switch connecting terminals with the corresponding rectilinear wires of the second scale, a second milliammeter, a circuit connecting said second milliammeter with the common terminal of the switch, a source of low A. C. voltage inserted in said circuit for feeding said second milliammeter, means for adjusting the voltage of said supply and means for grounding the metal sheaths and adapted to close the corresponding circuits over the corresponding milliammeters and the immersed parts of the corresponding scales.

4. An electric level indicator comprising a primary limnimetric scale including a plurality of metal contact-pieces lying at superposed levels, resistances connecting said contact-pieces in series, a first milliammeter, an electric circuit in which the milliammeter is inserted in series with the series of resistances and a supply of low A. C. voltage inserted in said circuit, and a secondary limnimetric scale including a plurality of similar independent metal parts extending each over an operative height equal to the spacing between two corresponding successive contact-pieces of the first scale, each of said parts lying in horizontal register with the interval separating the two corresponding successive contact-pieces of the first scale, a metal sheath open at both ends, surrounding said metal parts, contact pieces and resistances and being insulated with reference to said parts, said independent metal parts constituting resistances so arranged as to be progressively shorted out by the liquid to vary the effective resistance in the gauge circuit, a multiple-way switch constituted by a common terminal, a plurality of connecting terminals and means selectively connecting said common terminal with the different connecting terminals, leads connecting each of said switch connecting terminals with the corresponding parts of the second scale, a second milliammeter, a circuit connecting said second milliammeter with the common terminal of the switch, a source of low A. C. voltage inserted in said circuit for feeding said second milliammeter and means for grounding the metal sheath and adapted to close the corresponding circuits over the corresponding milliammeters and the immersed parts of the corresponding scales, an auxiliary container open at its upper end and containing a solution of reference electrical resistivity inside which the sheath of the limnimetric scales of the indicator is immersed for communication between the inside of said sheath and the inside of said auxiliary container, a completely closed outer container enclosing said auxiliary container, a pipe connecting the bottom of said outer container with the body of the liquid, the level in which is to be ascertained, to fill said bottom of the outer container with said liquid, and a piston forming oil mass filling completely the upper parts of the two containers above the solution and the liquid therein to transmit the pressure of said liquid to said container.

References Cited in the file of this patent

UNITED STATES PATENTS

| | | |
|---|---|---|
| 829,162 | Kjerulff | Aug. 21, 1906 |
| 1,133,023 | Hart et al. | Mar. 23, 1915 |
| 2,233,297 | Polin et al. | Feb. 25, 1941 |
| 2,289,202 | McCoy | July 7, 1942 |
| 2,589,714 | Lee | Mar. 18, 1952 |

FOREIGN PATENTS

| | | |
|---|---|---|
| 552,079 | Great Britain | Mar. 22, 1943 |